United States Patent
Minami

(10) Patent No.: US 12,187,868 B2
(45) Date of Patent: Jan. 7, 2025

(54) POLY(3-HYDROXYALKANOATE) FOAM PARTICLES AND POLY(3-HYDROXYALKANOATE) FOAM MOLDED ARTICLE

(71) Applicant: KANEKA CORPORATION, Osaka (JP)

(72) Inventor: Tetsuya Minami, Settsu (JP)

(73) Assignee: KANEKA CORPORATION, Osaka (JP)

( * ) Notice: Subject to any disclaimer, the term of this patent is extended or adjusted under 35 U.S.C. 154(b) by 581 days.

(21) Appl. No.: 17/622,555

(22) PCT Filed: May 7, 2020

(86) PCT No.: PCT/JP2020/018534
§ 371 (c)(1),
(2) Date: Dec. 23, 2021

(87) PCT Pub. No.: WO2021/002092
PCT Pub. Date: Jan. 7, 2021

(65) Prior Publication Data
US 2022/0289927 A1    Sep. 15, 2022

(30) Foreign Application Priority Data

Jul. 2, 2019   (JP) .................................. 2019-123634

(51) Int. Cl.
*C08J 9/18*      (2006.01)
*C08J 9/00*      (2006.01)
(Continued)

(52) U.S. Cl.
CPC .............. *C08J 9/18* (2013.01); *C08J 9/0023* (2013.01); *C08J 9/122* (2013.01); *C08J 9/232* (2013.01);
(Continued)

(58) Field of Classification Search
CPC ... C08J 9/18; C08J 9/0023; C08J 9/122; C08J 9/232; C08J 2201/026; C08J 2203/06; C08J 2367/04; C08L 67/04
(Continued)

(56) References Cited

U.S. PATENT DOCUMENTS 9,732,192 B1 *   8/2017   King .................. C08G 63/48
10,760,183 B2 *  9/2020   Kikutani ............ C08K 5/053
(Continued)

FOREIGN PATENT DOCUMENTS

JP    2001-49021 A       2/2001
JP    2007302778 A  *   11/2007  ............. B29C 47/92
(Continued)

OTHER PUBLICATIONS

International Search Report issued Jul. 21, 2020 in PCT/JP2020/018534 filed May 7, 2020, 3 pages.

*Primary Examiner* — Michael M. Bernshteyn
(74) *Attorney, Agent, or Firm* — Oblon, McClelland, Maier & Neustadt, L.L.P.

(57) ABSTRACT

Provided are poly(3-hydroxyalkanoate) foam particles in which a gel fraction of the whole foam particles is from 30 to 80% by weight and a difference in gel fraction between inside and outside of the foam particles is 25% by weight or less. Preferably, the foam particles are particles crosslinked by an organic peroxide. Preferably, the organic peroxide has a 1 hour half-life temperature of 114 to 124° C., contains a carbonate group, and is liquid at room temperature.

16 Claims, 1 Drawing Sheet

(51) Int. Cl.
*C08J 9/12* (2006.01)
*C08J 9/232* (2006.01)
*C08L 67/04* (2006.01)

(52) U.S. Cl.
CPC ......... *C08L 67/04* (2013.01); *C08J 2201/026* (2013.01); *C08J 2203/06* (2013.01); *C08J 2367/04* (2013.01)

(58) Field of Classification Search
USPC .......................................................... 521/59
See application file for complete search history.

(56) References Cited

U.S. PATENT DOCUMENTS

| | | | |
|---|---|---|---|
| 11,459,436 B2* | 10/2022 | Minami | ................... C08J 9/232 |
| 2009/0197982 A1 | 8/2009 | Miyagawa et al. | |
| 2017/0362396 A1* | 12/2017 | Minami | .................. C08L 67/04 |
| 2019/0003082 A1* | 1/2019 | Kikutani | .................... D01F 6/92 |
| 2020/0354539 A1* | 11/2020 | Minami | ..................... C08J 9/16 |
| 2023/0331950 A1* | 10/2023 | Minami | .................. C08L 67/04 |

FOREIGN PATENT DOCUMENTS

| | | | | |
|---|---|---|---|---|
| JP | 2012241196 A | * | 12/2012 | ............. C08G 73/14 |
| WO | WO-2006103972 A1 | * | 10/2006 | ................ C08J 9/18 |
| WO | WO-2007049694 A1 | * | 5/2007 | ......... B29C 44/3461 |
| WO | WO 2012/170215 A1 | | 12/2012 | |
| WO | WO-2019022008 A1 | * | 1/2019 | ......... B29C 49/0005 |

* cited by examiner

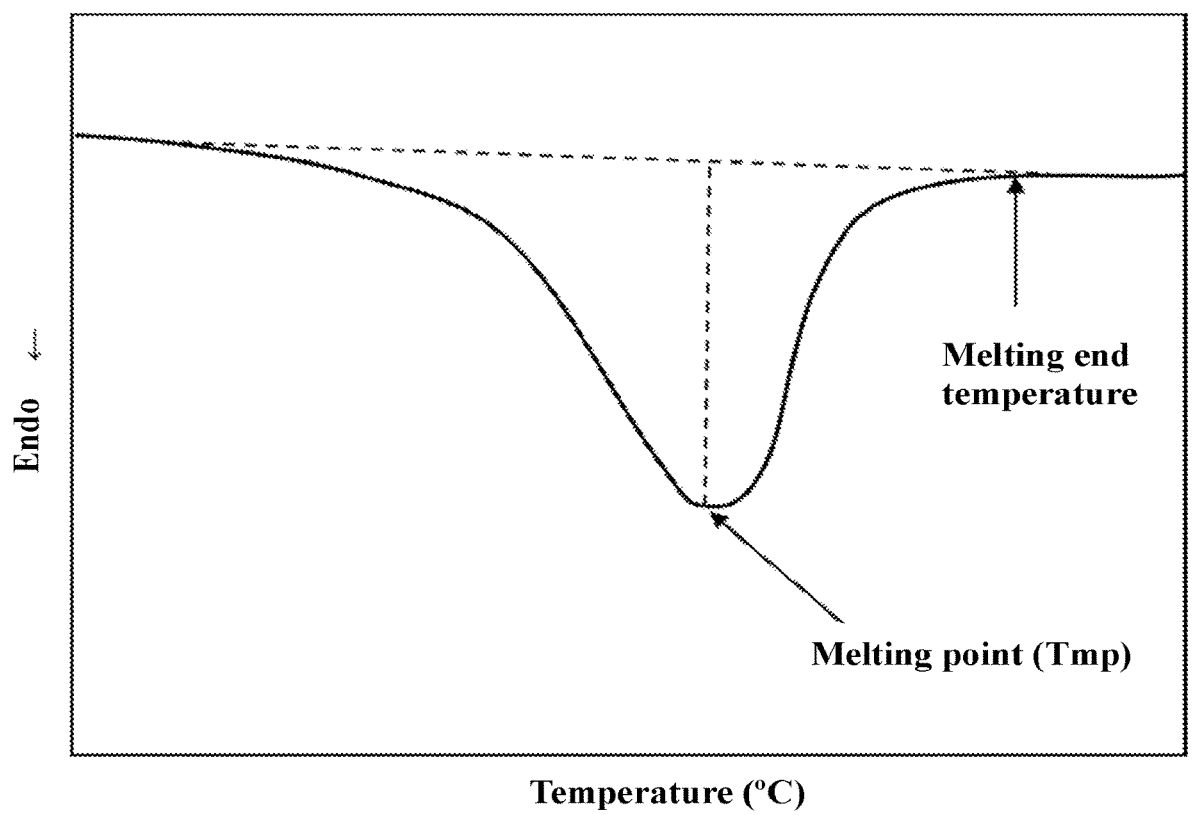

POLY(3-HYDROXYALKANOATE) FOAM PARTICLES AND POLY(3-HYDROXYALKANOATE) FOAM MOLDED ARTICLE

TECHNICAL FIELD

The present invention relates to poly(3-hydroxyalkanoate) foam particles produced by foaming resin particles made of a poly(3-hydroxyalkanoate) composition and to a poly(3-hydroxyalkanoate) foam molded article produced by molding the foam particles.

BACKGROUND ART

A huge amount of petroleum-based plastics are discarded as waste every year. The huge amount of waste plastics have brought about the problems of a shortage of landfill sites and environmental pollution, and these problems have become a serious concern. Additionally, in recent years, microplastics have caused significant harm to the marine environment. Against this background, increasing attention has been paid to biodegradable plastics which are degradable by the action of microorganisms in the environment such as the sea and earth, in landfill sites, and in compost. The development of biodegradable plastics has been pursued with the goal of applying them to a wide variety of products such as materials for agriculture, forestry, and fishery which are used in the environment and food containers, packaging materials, hygiene products, and garbage bags which are difficult to collect and recycle after use. Further, foams made of biodegradable plastics are promising for use in cushioning materials for packaging, boxes for agricultural products, boxes for fishes, automobile parts, materials for building construction, and materials for civil engineering.

Among biodegradable plastics as described above, poly (3-hydroxyalkanoates) (hereinafter referred to also as "P3HAs"), which are plant-derived plastics, are drawing attention in terms of high biodegradability and carbon neutral. Among poly(3-hydroxyalkanoates), poly(3-hydroxybutyrate) (hereinafter referred to also as "P3HB"), poly(3-hydroxybutyrate-co-3-hydroxyvalerate) (hereinafter referred to also as "P3HB3HV"), poly(3-hydroxybutyrate-co-3-hydroxyhexanoate) (hereinafter referred to also as "P3HB3HH"), and poly(3-hydroxybutyrate-co-4-hydroxybutyrate) (hereinafter referred to also as "P3HB4HB") are attracting particular attention.

Researches have been conducted to use the above biodegradable plastics in foam products. For example, Patent Literature 1 discloses polyester resin foam particles having biodegradability and a foam particle molded article produced by placing the foam particles into a mold and heating the foam particles to fuse the foam particles together.

Patent Literature 2 discloses polyhydroxyalkanoate resin foam particles made of a polyhydroxyalkanoate resin composition containing a polyhydroxyalkanoate and an isocyanate compound and having a melt viscosity equal to or higher than a given value.

Patent Literature 3 discloses a method for producing a foam by treating a polyhydroxyalkanoate or polylactic acid with an organic peroxide without intermediate formation of foam particles.

CITATION LIST

Patent Literature

PTL 1: JP-A No. 2001-49021
PTL 2: WO 2007/049694
PTL 3: WO 2012/170215

SUMMARY OF INVENTION

Technical Problem

Patent Literature 1 reports that with the use of polyester resin foam particles in which the chloroform insoluble fraction in the inside of the foam particles is 20% by weight or more, a polyester resin foam particle molded article can be obtained without formation of huge cells in the inside of the molded article. However, in the foam particles described in this literature, there is a large difference between the chloroform insoluble fraction in the inside of the foam particles and the chloroform insoluble fraction of the whole foam particles or the chloroform insoluble fraction in the outside of the foam particles. The present inventors have confirmed that the large difference in chloroform insoluble fraction could lead to uneven expansion in each of the foam particles subjected to multistep foaming or in-mold foam molding, resulting color unevenness of the molded article produced.

Patent Literature 2 reports that polyhydroxyalkanoate resin foam particles which are moldable into a foam molded article free from post-shrinkage under a wide range of molding conditions can be obtained by melting and kneading a polyhydroxyalkanoate and an isocyanate compound using a device such as an extruder to give a polyhydroxyalkanoate resin composition having a melt viscosity equal to or higher than a given value and then by foaming the resin composition with the aid of a blowing agent. However, in the production method described in this literature, since the polyhydroxyalkanoate is melted and kneaded together with the isocyanate compound using a device such as an extruder to achieve an increased melt viscosity, a heavy load is imposed on the device such as an extruder, and the throughput rate needs to be low. As such, the production method has the problem of low productivity. Additionally, the high melt viscosity leads to a likelihood of melt fracture, and this makes it difficult to produce uniform polyhydroxyalkanoate resin particles having a small weight per piece. The present inventors have confirmed that for the above reasons, the resulting foam particles could vary in expansion ratio and the resulting foam molded article could be unevenly colored.

Patent Literature 3 reports a method for producing a foam by melting and reacting a polyhydroxyalkanoate and an organic peroxide at a high temperature for a short time without using any blowing agent. However, in this literature, which does not describe foam particles, the foam is produced without intermediate formation of foam particles, and thus the shape of the foam is irregular. Further, the present inventors have confirmed that the resulting foam has a high density, due to which the foam has the problem of limited application.

In view of the above circumstances, the present invention aims to provide poly(3-hydroxyalkanoate) foam particles which are moldable by in-mold foam molding under a wide range of molding conditions and from which a foam molded article with reduced color unevenness can be obtained. The present invention further aims to provide the foam molded article.

Solution to Problem

As a result of intensive researches with the goal of solving the above problems, the present inventors have found that when the gel fraction of whole poly(3-hydroxyalkanoate)

foam particles is within a given range and the difference in gel fraction between inside and outside of the foam particles is equal to or less than a given value, the range of molding conditions usable in in-mold foam molding for producing a foam molded article from the poly(3-hydroxyalkanoate) foam particles can be widened, and a foam molded article with reduced color unevenness can be obtained. Based on this finding, the inventors have completed the present invention.

A first aspect of the present invention relates to poly(3-hydroxyalkanoate) foam particles, wherein a gel fraction of the whole foam particles is from 30 to 80% by weight, and a difference in gel fraction between inside and outside of the foam particles is 25% by weight or less. Preferably, a weight per piece of the foam particles is from 0.3 to 10 mg, and a length/diameter ratio of the foam particles is from 0.5 to 2.5. Preferably, the poly(3-hydroxyalkanoate) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate). More preferably, the poly(3-hydroxyalkanoate) is a copolymer of 3-hydroxybutyrate and a comonomer, and a 3-hydroxybutyrate/comonomer ratio in the copolymer is from 99/1 to 80/20 (mol %/mol %).

Preferably, the foam particles are particles crosslinked by an organic peroxide. More preferably, the organic peroxide has a 1 hour half-life temperature of 114 to 124° C., contains a carbonate group, and is liquid at room temperature. Preferably, an apparent density of the foam particles is from 20 to 150 g/L.

A second aspect of the present invention relates to a poly(3-hydroxyalkanoate) foam molded article produced by molding the foam particles.

A third aspect of the present invention relates to a method for producing the foam particles, the method comprising: dispersing poly(3-hydroxyalkanoate)-containing resin particles and a crosslinking agent into water in a pressure-resistant vessel; subsequently introducing a blowing agent into the pressure-resistant vessel and heating the contents of the pressure-resistant vessel to or above a softening temperature of the resin particles; and subsequently opening one end of the pressure-resistant vessel to discharge the contents of the pressure-resistant vessel into a low-pressure atmosphere and thus foam the resin particles, wherein the crosslinking agent is an organic peroxide that has a 1 hour half-life temperature of 114 to 124° C., that contains a carbonate group, and that is liquid at room temperature, and the crosslinking agent is used in an amount of 1.2 to 5 parts by weight per 100 parts by weight of the resin particles. Preferably, the organic peroxide is a compound containing one carbonate group. Preferably, the contents of the pressure-resistant vessel are subjected to a temperature of 100 to 140° C. when heated to or above the softening temperature of the resin particles.

Advantageous Effects of Invention

The present invention can provide poly(3-hydroxyalkanoate) foam particles which are moldable by in-mold foam molding under a wide range of molding conditions and from which a foam molded article with reduced color unevenness can be obtained. The present invention can further provide the foam molded article.

BRIEF DESCRIPTION OF DRAWINGS

The Figure shows a DSC curve of resin particles made of a P3HA composition and parameters such as melting point which are determined based on the DSC curve.

DESCRIPTION OF EMBODIMENTS

Hereinafter, embodiments of P3HA foam particles (poly (3-hydroxyalkanoate) foam particles) and a P3HA foam molded article (poly(3-hydroxyalkanoate) foam molded article) of the present invention will be described in detail. The present invention is not limited to the embodiments described below.

The P3HA foam particles of the present disclosure can be obtained, for example, by foaming resin particles made of a P3HA composition with the aid of a blowing agent. The P3HA foam molded article can be obtained by molding the P3HA foam particles, in particular, for example, by subjecting the P3HA foam particles to in-mold foam molding.

[P3HA]

The P3HA is a polymer containing 3-hydroxyalkanoate repeating units as essential structural unit (monomer unit). In particular, the P3HA is preferably a polymer containing repeating units represented by the following formula (1).

$$[-CHR-CH_2-CO-O-] \quad (1)$$

In the formula (1), R is an alkyl group represented by $C_pH_{2p+1}$ and p is an integer of 1 to 15. Examples of the R group include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

The P3HA is particularly preferably a microbially produced P3HA. The microbially produced P3HA is a poly [(R)-3-hydroxyalkanoate] in which all of the 3-hydroxyalkanoate repeating units are (R)-3-hydroxyalkanoate repeating units.

The P3HA preferably contains 50 mol % or more 3-hydroxyalkanoate repeating units (in particular, the repeating units of the formula (1)) in the total repeating units, and the content of the 3-hydroxyalkanoate repeating units is more preferably 70 mol % or more and even more preferably 80 mol % or more. The P3HA may contain only the 3-hydroxyalkanoate repeating units as the repeating units (monomer units) or may contain other repeating units (such as 4-hydroxyalkanoate repeating units) in addition to the 3-hydroxyalkanoate repeating units.

The P3HA preferably contains 80 mol % or more 3-hydroxybutyrate (hereinafter referred to also as "3HB") units as repeating units (monomer units), and the content of the 3HB units is more preferably 85 mol % or more. In particular, the P3HA is preferably a P3HA (microbially produced P3HA) in which all of the 3-hydroxybutyrate units are (R)-3-hydroxybutyrate units. Specific examples of the P3HA include poly(3-hydroxybutyrate), poly(3-hydroxybutyrate-co-3-hydroxypropionate), poly(3-hydroxybutyrate-co-3-hydroxyvalerate) (P3HB3HV), poly(3-hydroxybutyrate-co-3-hydroxyvalerate-3-hydroxyhexanoate), poly(3-hydroxybutyrate-co-3-hydroxyhexanoate) (P3HB3HH), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) (P3HB4HB). Among these, at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate) is preferred. In particular, in terms of processability and the physical properties of the foam molded article, poly(3-hydroxybutyrate-co-3-hydroxyhexanoate) and/or poly(3-hydroxybutyrate-co-4-hydroxybutyrate) is more preferred, and poly(3-hydroxybutyrate-co-3-hydroxyhexanoate) is particularly preferred.

When the P3HA is a polymer containing 3-hydroxybutyrate units as essential structural units, the composition ratio between 3-hydroxybutyrate and a comonomer copolymerized with 3-hydroxybutyrate, such as 3-hydroxyhexanoate (hereinafter referred to also as "3HH") or 4-hydroxybutyrate (hereinafter referred to also "4HB"), i.e., the 3-hydroxybutyrate/comonomer ratio in the copolymer is preferably from 99/1 to 80/20 (mol %/mol %), more preferably from 97/3 to 80/20 (mol %/mol %), and even more preferably from 95/5 to 85/15 (mol %/mol %). If the proportion of the comonomer is less than 1 mol %, the melt processing temperature range and thermal decomposition temperature range of the P3HA are close to each other, and this is likely to lead to poor processability. If the proportion of the comonomer is more than 20 mol %, crystallization is slow during melt processing, and this is likely to lead to low productivity.

The proportions of the monomers of the P3HA can be determined by a method known to those skilled in the art, such as by a method described in WO 2013/147139.

The melting point of the P3HA is not particularly limited, but is preferably from 110 to 165° C. and more preferably from 120 to 155° C. If the melting point is lower than 110° C., the resulting P3HA foam molded article is likely to undergo a large dimensional change upon heating. If the melting point is higher than 165° C., hydrolysis is likely to occur during the foaming step. The melting point of the P3HA is measured as the highest melting peak temperature in a DSC curve obtained by differential scanning calorimetry which uses a differential scanning calorimeter (DSC 6200 manufactured by Seiko Instruments Inc.) and in which about 2 mg of the P3HA is heated from 10° C. to 190° C. at a rate of 10° C./min.

The weight-average molecular weight of the P3HA is not particularly limited, but is preferably from $20 \times 10^4$ to $200 \times 10^4$, more preferably from $25 \times 10^4$ to $150 \times 10^4$, and even more preferably from $30 \times 10^4$ to $100 \times 10^4$. If the weight-average molecular weight is less than $20 \times 10^4$, the resulting P3HA foam particles are likely to have a low closed-cell ratio. If the weight-average molecular weight is more than $200 \times 10^4$, a high load is imposed on the machinery used in melt processing such as production of the resin particles, and this is likely to lead to low productivity. The weight-average molecular weight of the P3HA can be determined based on a polystyrene-equivalent molecular weight distribution obtained by gel permeation chromatography (HPLC GPC system manufactured by Shimadzu Corporation) using a chloroform solution of the P3HA. The column used in the gel permeation chromatography may be any column suitable for weight-average molecular weight measurement.

The method for producing the P3HA is not limited to a particular technique, and may be a chemical synthesis production method or a microbial production method. As previously stated, a microbial production method is preferred. The microbial production method used can be a known or common method.

Known examples of bacteria that produce copolymers of 3-hydroxybutyrate and other hydroxyalkanoates include *Aeromonas caviae* which is a P3HB3HV- and P3HB3HH-producing bacterium and *Alcaligenes eulrophus* which is a P3HB4HB-producing bacterium. In particular, in order to increase the P3HB3HH productivity, *Alcaligenes eutrophus* AC32 (FERM BP-6038) having a P3HA synthase gene introduced is more preferred (see T. Fukui, Y. Doi, *J. Bateriol.*, 179, pp. 4821-4830 (1997)). Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable P3HA synthesis-related gene introduced may be used depending on the P3HA to be produced. The culture conditions including the type of the substrate may be optimized depending on the P3HA to be produced.

The P3HA used may be a single P3HA or a combination of two or more P3HAs.

[Resin Particles Made of P3HA Composition]

The resin particles made of a P3HA composition are particles made of a composition containing the P3HA as an essential component (P3HA composition). This composition typically contains the P3HA and additives used as needed. In the present disclosure, the "resin particles" refer to unfoamed particles that have yet to be subjected to any foaming step.

The content of the P3HA in the resin particles made of the P3HA composition is not particularly limited. In terms of the properties such as biodegradability of the resulting foam particles and foam molded article, the content of the P3HA is preferably 70% by weight or more and more preferably 80% by weight or more.

The melting point (hereinafter referred to also as "Tmp") of the resin particles made of the P3HA composition is not particularly limited, but is preferably from 110 to 165° C. and more preferably from 120 to 155° C. If the melting point is lower than 110° C., the resulting P3HA foam molded article is likely to undergo a large dimensional change upon heating. If the melting point is higher than 165° C., hydrolysis is likely to occur during the foaming step. The melting point of the resin particles made of the P3HA composition is measured as the highest melting peak temperature in a DSC curve obtained by differential scanning calorimetry which uses a differential scanning calorimeter (DSC 6200 manufactured by Seiko Instruments Inc.) and in which about 5 mg of the resin particles made of the P3HA composition are heated from 10° C. to 190° C. at a rate of 10° C./min.

The melt flow rate (hereinafter referred to also as "MFR") of the resin particles made of the P3HA composition is not particularly limited, but is preferably from 1 to 30 g/10 min, more preferably from 1 to 25 g/10 min, and even more preferably from 1 to 20 g/10 min. If the MFR is less than 1 g/10 min, foam particles having a low apparent density are likely to be difficult to obtain by a single foaming step. If the MFR is more than 30 g/10 min, the resulting foam particles are likely to have a low closed-cell ratio. The MFR of the resin particles made of the P3HA composition can be measured using a melt flow index tester (manufactured by Yasuda Seiki Seisakusho, Ltd.) according to JIS K 7210 under a load of 5 kg at a measurement temperature which is 1 to 10° C. above the melting end temperature observed in the DSC curve obtained in "the measurement of the melting point of the resin particles made of the P3HA composition".

The weight per piece of the resin particles made of the P3HA composition is preferably from 0.3 to 10 mg, more preferably from 0.4 to 7.5 mg, and preferably from 0.5 to 5 mg. If the weight per piece is less than 0.3 mg, the resin particles made of the P3HA composition are likely to be difficult to produce stably with high productivity. If the weight per piece is more than 10 mg, thinning of the P3HA foam molded article is likely to be difficult.

When the resin particles made of the P3HA composition are cylindrical in shape, the length/diameter ratio of the resin particles is preferably from 0.5 to 3, more preferably from 0.7 to 2.7, and even more preferably from 1 to 2.5. If the length/diameter ratio is less than 0.5, the resulting foam particles are likely to be flattened in shape. If the length/diameter ratio is more than 3, the foam particles are likely to be elongated in shape.

The resin particles made of the P3HA composition may contain additives to the extent that the additives do not impair the effect of the invention. Examples of the additives include a cell controlling agent, a nucleating agent, a lubricant, a plasticizer, an antistatic, a flame retardant, a conductive additive, a heat insulator, a crosslinking agent, an antioxidant, an ultraviolet absorber, a coloring agent, an inorganic filler, an organic filler, and a hydrolysis inhibitor, and these additives can be used according to the purpose. In particular, biodegradable additives are preferred.

Examples of the cell controlling agent include talc, silica, calcium silicate, calcium carbonate, aluminum oxide, titanium oxide, diatomite, clay, sodium bicarbonate, alumina, barium sulfate, aluminum oxide, and bentonite. Among these, talc is preferred due to its superiority in dispersibility in the P3HA. The amount of the cell controlling agent used is not particularly limited, but is preferably from 0.01 to 1 parts by weight, more preferably from 0.03 to 0.5 parts by weight, and even more preferably from 0.05 to 0.3 parts by weight per 100 parts by weight of the P3HA. One cell controlling agent may be used alone, or two or more cell controlling agents may be mixed. The mixing ratio between the two or more cell controlling agents can be adjusted as appropriate according to the purpose.

Examples of the nucleating agent include pentaerythritol, orotic acid, aspartame, cyanuric acid, glycine, zinc phenylphosphonate, and boron nitride. Among these, pentaerythritol is preferred due to its superiority in the promoting effect on the crystallization of the P3HA. The amount of the nucleating agent used is not particularly limited, but is preferably from 0.1 to 5 parts by weight, more preferably from 0.5 to 3 parts by weight, and even more preferably from 0.7 to 1.5 parts by weight per 100 parts by weight of the P3HA. One nucleating agent may be used alone, or two or more nucleating agents may be mixed. The mixing ratio between the two or more nucleating agents can be adjusted as appropriate according to the purpose.

Examples of the lubricant include behenamide, oleamide, erucamide, stearamide, palmitamide, N-stearyl behenamide, N-stearyl erucamide, ethylenebis(stearamide), ethylenebis(oleamide), ethylenebis(erucamide), ethylenebis(lauramide), ethylenebis(capramide), p-phenylenebis(stearamide), and a product of polycondensation of ethylenediamine, stearic acid, and sebacic acid. Among these, behenamide and erucamide are preferred due to their superiority in the lubricating effect on the P3HA. The amount of the lubricant used is not particularly limited, but is preferably from 0.01 to 5 parts by weight, more preferably from 0.05 to 3 parts by weight, and even more preferably from 0.1 to 1.5 parts by weight per 100 parts by weight of the P3HA. One lubricant may be used alone, or two or more lubricants may be mixed. The mixing ratio between the two or more lubricants can be adjusted as appropriate according to the purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred due to their superiority in the plasticizing effect on the P3HA. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not particularly limited, but is preferably from 1 to 20 parts by weight, more preferably from 2 to 15 parts by weight, and even more preferably from 3 to 10 parts by weight per 100 parts by weight of the P3HA. One plasticizer may be used alone, or two or more plasticizers may be mixed. The mixing ratio between the two or more plasticizers can be adjusted as appropriate according to the purpose.

Examples of the coloring agent include: organic pigments such as azo pigments, polycondensed azo pigments, azomethine-containing azo pigments, azomethine pigments, anthraquinone pigments, phthalocyanine pigments, perinone/perylene pigments, indigo/thioindigo pigments, dioxazine pigments, quinacridone pigments, isoindolinone pigments, diketopyrrolopyrrole pigments, and quinophthalone pigments; and inorganic pigments such as iron oxide pigments, iron hydroxide pigments, iron hexacyanoferrate pigments, carbon black pigments, titanium oxide pigments, and composite oxide pigments. The amount of the coloring agent used is not particularly limited, but is preferably from 0.001 to 5 parts by weight, more preferably from 0.05 to 5 parts by weight, and even more preferably from 0.1 to 2 parts by weight per 100 parts by weight of the P3HA. One coloring agent may be used alone, or two or more coloring agents may be mixed. The mixing ratio between the two or more coloring agents can be adjusted as appropriate according to the purpose.

In production of the resin particles made of the P3HA composition, a compound containing an isocyanate group can be used (this compound will be referred to as "isocyanate compound" hereinafter). However, some isocyanate compounds have toxicity. Additionally, the resulting P3HA foam particles or foam molded article can be yellowed in some cases. Thus, the amount of the isocyanate compound used is preferably less than 3 parts by weight, more preferably less than 1 parts by weight, and even more preferably less than 0.1 parts by weight per 100 parts by weight of the P3HA. Most preferably, the resin particles are free of any isocyanate compound.

For example, a polyisocyanate compound containing two or more isocyanate groups per molecule can be used as the isocyanate compound. Specific examples of the isocyanate compound include aromatic, alicyclic, and aliphatic isocyanates. Examples of the aromatic isocyanates include isocyanate compounds having a tolylene, diphenylmethane, naphthylene, tolidine, xylene, or triphenylmethane skeleton. Examples of the alicyclic isocyanates include isocyanate compounds having an isophorone skeleton or a hydrogenated diphenylmethane skeleton. Examples of the aliphatic isocyanates include isocyanate compounds having a hexamethylene or lysine skeleton. A combination of two or more of the above isocyanate compounds can be used. In terms of utility, ease of handling, and weathering resistance, the use of a polyisocyanate having a tolylene or diphenylmethane skeleton is preferred, and the use of a polyisocyanate having a diphenylmethane skeleton is particularly preferred.

The resin particles made of the P3HA composition (and also the P3HA foam particles) may be substantially free of a resin component other than the P3HA (this resin component is referred to also as "additional resin component") or may further contain the additional resin component. Examples of the additional resin component include aliphatic or aliphatic-aromatic polyesters such as polylactic acid, polybutylene succinate, polybutylene succinate adipate, polybutylene adipate terephthalate, polybutylene succinate terephthalate, and polycaprolactone. One additional resin component may be used alone, or two or more additional resin components may be used in combination. The content of the additional resin component in the resin particles made of the P3HA composition (and also in the P3HA foam particles) is not particularly limited. For example, the content of the additional resin component is preferably from 10 to 400 parts by weight and more preferably from 50 to 150 parts by weight per 100 parts by weight of the P3HA.

The method for producing the resin particles made of the P3HA composition is not limited to a particular technique, and the resin particles made of the P3HA composition can be produced using a known or common method. For example, the P3HA and optionally the additives are first melted and kneaded using a device such as an extruder, a kneader, a Banbury mixer, or a roll, then the molten P3HA composition is discharged from a die nozzle and cooled, and the cooled composition is cut. With this method, resin particles shaped to be easily usable in foaming can be obtained, such as cylindrical, elliptic cylindrical, spherical, cubic, or rectangular parallelepiped-shaped resin particles. A twin-screw extruder is preferred as the production device in terms of productivity and convenience.

In the production method of the resin particles made of the P3HA composition, the temperature at which the P3HA and optionally the additives are melted and kneaded depends on the properties such as the melting point and weight-average molecular weight of the P3HA and on the additives used and cannot be definitely specified. For example, the temperature of the molten P3HA composition discharged from the die nozzle is preferably from 150 to 200° C., more preferably from 160 to 195° C., and even more preferably from 170 to 190° C. If the temperature of the molten P3HA composition is lower than 150° C., melting and kneading of the P3HA composition are likely to be insufficient. If the temperature of the molten P3HA composition is higher than 200° C., the P3HA is likely to be thermally decomposed.

In the production method of the resin particles made of the P3HA composition, the temperature at which the molten P3HA composition discharged from the die nozzle is cooled is not particularly limited, but is preferably from 20 to 80° C., more preferably from 30 to 70° C., and even more preferably from 40 to 60° C. If the cooling temperature is lower than 20° C., the crystallization of the molten P3HA composition is slow, and this is likely to lead to low productivity in the production of the resin particles made of the P3HA composition. If the cooling temperature is higher than 80° C., the crystallization of the molten P3HA composition is slow, and this is likely to lead to low productivity in the production of the resin particles made of the P3HA composition.

[P3HA Foam Particles]

The P3HA foam particles of the present disclosure can be obtained, for example, by foaming the above resin particles made of the P3HA composition with the aid of a blowing agent. The P3HA foam particles of the present disclosure meet the following two requirements [1] and [2].

[1] The gel fraction of the whole foam particles is from 30 to 80% by weight.

[2] The difference in gel fraction between inside and outside of the foam particles is 25% by weight or less.

The gel fraction of the P3HA foam particles is an indicator of the degree of crosslinking of the P3HA in the foam particles. In the present disclosure, the gel fraction of the whole P3HA foam particles is from 30 to 80% by weight, preferably from 40 to 79% by weight, and more preferably from 50 to 78% by weight. If the gel fraction is less than 30% by weight, the foam particles could not be molded into a foam molded article by in-mold foam molding or, even when the foam particles are moldable into a foam molded article by in-mold foam molding, the range of usable molding conditions is narrow. If the gel fraction is more than 80% by weight, foam particles having a low apparent density are difficult to obtain by a single foaming step. The gel fraction of the P3HA foam particles can be controlled, in particular, depending on the type or amount of the crosslinking agent described later.

The method for measuring the gel fraction of the whole P3HA foam particles is as follows. A 100-ml flask is charged with 0.5 g of the foam particles and 50 ml of chloroform, which are heated under reflux at atmospheric pressure and 62° C. for 8 hours. The resulting heat-treated product is subjected to filtration using a suction filtration device equipped with a 100-mesh metal screen. The resulting filtered product on the mesh screen is dried in an oven at 80° C. under vacuum for 8 hours. The weight Wgw (g) of the resulting dried product is measured. The gel fraction is calculated as Wgw/0.5×100 (% by weight).

In the present disclosure, the difference between the gel fraction in the inside of the P3HA foam particles and the gel fraction in the outside of the P3HA foam particles is 25% by weight or less, preferably 15% by weight or less, more preferably 10% by weight or less, and even more preferably 5% by weight or less. By thus controlling the gel fraction so that the difference in gel fraction between the inside and outside of the foam particles is reduced, the unevenness of expansion in each of the foam particles subjected to multi-step foaming or in-mold foam molding is reduced, and consequently the color unevenness of the foam molded article produced can be prevented.

The "inside of the foam particle" is defined herein as a central portion of the foam particle that has been cut into a rectangular parallelepiped having a weight equal to half of the weight per piece of the foam particles. The "outside of the foam particle" refers to a surface portion of the foam particle and includes all portions other than the inside as defined above.

As for the lower limit of the difference in gel fraction between the inside and outside of the P3HA foam particles, the difference may be 0% by weight or more or may be 1% by weight or more. The difference in gel fraction between the inside and outside of the P3HA foam particles can be controlled, in particular, depending on the type of the crosslinking agent described later.

To measure the gel fraction in the inside or outside of the P3HA foam particles, the P3HA foam particles may be divided into the inside and outside, and the inside or outside may be subjected to the gel fraction measurement method described above.

The weight per piece of the P3HA foam particles is preferably from 0.3 to 10 mg, more preferably from 0.4 to 7.5 mg, and even more preferably from 0.5 to 5 mg. If the weight per piece is less than 0.3 mg, the resin particles made of the P3HA composition are likely to be difficult to produce stably with high productivity, and thus the resulting P3HA foam particles are likely to be non-uniform. If the weight per piece is more than 10 mg, thinning of the P3HA foam molded article is likely to be difficult.

When the P3HA foam particles are cylindrical in shape, the length/diameter ratio of the foam particles is preferably from 0.5 to 2.5, more preferably from 0.7 to 1.5, and even more preferably from 0.8 to 1.2. If the length/diameter ratio is less than 0.5, the surface texture of the foam molded article is likely to be poor. If the length/diameter ratio is more than 2.5, the filling performance in in-mold foam molding is likely to be low.

The apparent density of the P3HA foam particles is not particularly limited, but is preferably from 20 to 150 g/L, more preferably from 23 to 140 g/L, and even more preferably from 25 to 130 g/L. In the case where P3HA foam particles having a desired apparent density cannot be obtained by a single foaming step, the foam particles resulting from the first foaming step may be subjected to the second and subsequent foaming steps. The apparent density of the P3HA foam particles is measured as follows. A graduated cylinder containing ethanol is prepared, and the foam particles weighing Wd (g) are submerged into the ethanol in the graduated cylinder using a tool such as a metal screen. The volume Vd (L) of the foam particles is determined from the increase in the ethanol level. The apparent density of the foam particles is calculated as Wd/Vd (g/L).

The closed-cell ratio of the P3HA foam particles is not particularly limited, but is preferably 88% or more, more preferably 90% or more, and even more preferably 93% or more. If the closed-cell ratio is less than 88%, the mold shrinkage ratio of the resulting foam molded article is likely to be high. The method for measuring the closed-cell ratio of the P3HA foam particles is as follows. The volume Vc ($cm^3$) of the P3HA foam particles is measured using an air comparison pycnometer (Model 1000, manufactured by Tokyo-Science, Co., Ltd.) according to the method specified in PROCEDURE C of ASTM D2856-87. Next, all of the foam particles subjected to the measurement of the volume Vc are submerged into ethanol in a graduated cylinder, and the apparent volume Va ($cm^3$) of the foam particles is determined from the increase in the liquid level of the graduated cylinder (submersion method). The closed-cell ratio of the foam particles is calculated as 100−(Va−Vc)×100/Va (%).

The average cell size of the P3HA foam particles is not particularly limited, but is preferably from 50 to 500 μm and more preferably from 100 to 400 μm. The method for measuring the average cell size of the P3HA foam particles is as follows. The foam particles are cut into halves with a razor blade (Hi-stainless Double Edge Blade, manufactured by FEATHER Safety Razor Co., Ltd.). The cut surface of each foam particle is observed with an optical microscope (VHX-100, manufactured by Keyence Corporation) at 50-fold magnification, and a straight line passing substantially through the center of the foam particle is drawn in the observed image. The number n of the cells through which the straight line passes is counted, and the foam particle size L (μm) defined by the intersections of the straight line with the outer surface of the foam particle is determined. The average cell size of the foam particles is calculated as L/n (μm).

The method for producing the P3HA foam particles is not limited to a particular technique. For example, the method described hereinafter can be used. For example, the resin particles made of the P3HA composition, water, a dispersant, a dispersion aid, a crosslinking agent, and optionally a crosslinking aid and plasticizer are placed into a pressure-resistant vessel under stirring and thoroughly dispersed, and then a blowing agent is introduced into the pressure-resistant vessel. After that, the contents of the pressure-resistant vessel are, if necessary, held at a certain temperature for a certain time to impregnate the resin particles with the blowing agent and impregnate and react the resin particles with the crosslinking agent. While the resin particles are impregnated with the blowing agent and impregnated and reacted with the crosslinking agent, the contents of the pressure-resistant vessel are heated to or above the softening temperature of the resin particles and then, if necessary, are held at around the temperature of foaming for a certain time, after which one end of the pressure-resistant vessel is opened to discharge the contents of the pressure-resistant vessel such as the resin particles and water into an atmosphere having a pressure lower than the pressure inside the pressure-resistant vessel, thereby foaming the resin particles and obtaining the P3HA foam particles (this series of procedures are referred to also as "depressurization foaming" hereinafter). The temperature inside the pressure-resistant vessel at the time of discharge into the low-pressure atmosphere is defined as the foaming temperature, and the pressure inside the pressure-resistant vessel at the time of discharge into the low-pressure atmosphere is defined as the foaming pressure.

The water is not limited to a particular type and may be any kind of water in which the resin particles made of the P3HA composition, the dispersant, the dispersion aid, the crosslinking agent, the blowing agent, and the other components can be uniformly dispersed. For example, the water used can be pure or ultrapure water such as RO water (water purified by reverse osmosis membrane filtration), distilled water, or deionized water (water purified using an ion-exchange resin). The amount of the water used is not particularly limited, but is preferably from 100 to 1000 parts by weight per 100 parts by weight of the resin particles made of the P3HA resin composition.

Examples of the dispersant include inorganic substances such as tricalcium phosphate, trimagnesium phosphate, basic magnesium carbonate, calcium carbonate, barium sulfate, kaolin, talc, clay, aluminum oxide, titanium oxide, and aluminum hydroxide. The amount of the dispersant used is not particularly limited, but is preferably from 0.1 to 3.0 parts by weight per 100 parts by weight of the resin particles made of the P3HA resin composition.

Examples of the dispersion aid include anionic surfactants such as sodium dodecylbenzenesulfonate, sodium α-olefin sulfonate, and sodium n-paraffin sulfonate. The amount of the dispersion aid used is not particularly limited, but is preferably from 0.001 to 0.5 parts by weight and more preferably from 0.01 to 0.2 parts by weight per 100 parts by weight of the resin particles made of the P3HA resin composition. The dispersant and the dispersion aid are preferably used in combination.

Examples of the crosslinking agent include organic peroxides. Organic peroxides need not be melted and kneaded together with the P3HA for mixing and reaction with the P3HA and, as previously stated, the resin particles can be impregnated and reacted with an organic peroxide after production of the resin particles. Thus, organic peroxides are crosslinking agents preferred in terms of the production process. In the case where an organic peroxide is used as the crosslinking agent, the molecular chains of the P3HA are bonded together directly (without the crosslinking agent-derived structures interposed between the molecular chains) to form a crosslinked structure.

To reduce the difference in gel fraction between the inside and outside of the foam particles, the crosslinking agent preferably has the property of undergoing the crosslinking reaction at around the softening temperature of the resin particles, being well compatible with the P3HA, and easily penetrating into the resin particles. From this viewpoint, the crosslinking agent is preferably an organic peroxide that has a 1 hour half-life temperature of 114 to 124° C., that contains a carbonate group, and that is liquid at room temperature. In particular, an organic peroxide containing one carbonate group is preferred since such an organic peroxide can have the 1 hour half-life temperature as specified above. Specific examples of the organic peroxide include t-butylperoxy-2-ethylhexyl monocarbonate (1 hour half-life temperature: 119° C.), t-butylperoxyisopropyl monocarbonate (1 hour half-life temperature: 118° C.), t-amylperoxy-2-ethylhexyl monocarbonate (1 hour half-life temperature: 117° C.), and t-amylperoxyisopropyl monocarbonate (1 hour half-life temperature: 115° C.). By crosslinking and foaming the resin particles into foam particles in the presence of the organic peroxide as described above, the difference in gel fraction between the inside and outside of the foam particles can be reduced, and consequently the color unevenness of the foam molded article produced from the foam particles can be prevented.

The amount of the crosslinking agent used is not particularly limited, but is preferably from 1.2 to 5 parts by weight, more preferably from 1.3 to 4 parts by weight, even more preferably from 1.4 to 3.5 parts by weight, and particularly preferably from 1.5 to 3 parts by weight per 100 parts by weight of the resin particles made of the P3HA resin composition. If the amount of the crosslinking agent used is less than 1.2 parts by weight, the gel fraction of the whole P3HA foam particles is not high enough, and the foam particles could not be molded into a foam molded article by in-mold foam molding or, even when the foam particles are moldable into a foam molded article by in-mold foam molding, the range of usable molding conditions is narrow. If the amount of the crosslinking agent used is more than 5 parts by weight, such use of the crosslinking agent is likely to be economically wasteful because the increase in the amount of the crosslinking agent does not necessarily provide an enhanced effect. With the use of a suitable amount of crosslinking agent, the P3HA in the P3HA foam particles can have a crosslinked structure, and the whole P3HA foam particles can meet the requirement as to the gel fraction. The amount of the crosslinking agent used is correlated with the gel fraction of the whole P3HA foam particles and has a large impact on the value of the gel fraction. Thus, it is desirable to strictly define the amount of the crosslinking agent taking into consideration the value of the gel fraction to be achieved.

Examples of the crosslinking aid include compounds having at least one unsaturated bond per molecule. Among such compounds, allyl esters, acrylic esters, methacrylic esters, and divinyl compounds are preferred. The amount of the crosslinking aid used is not particularly limited, but is preferably from 0.01 to 3 parts by weight, more preferably from 0.03 to 1.5 parts by weight, and even more preferably from 0.05 to 1 parts by weight per 100 parts by weight of the resin particles made of the P3HA resin composition. If the amount of the crosslinking aid used is less than 0.01 parts by weight, the effect of the crosslinking aid is likely to be small.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred due to their superiority in the plasticizing effect on the P3HA. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not particularly limited, but is preferably from 1 to 20 parts by weight, more preferably from 2 to 15 parts by weight, and even more preferably from 3 to 10 parts by weight per 100 parts by weight of the resin particles made of the P3HA composition. One plasticizer may be used alone, or two or more plasticizers may be mixed. The mixing ratio between the two or more plasticizers can be adjusted as appropriate according to the purpose.

Examples of the blowing agent include: inorganic gases such as carbon dioxide, nitrogen, and air; saturated hydrocarbons having 3 to 5 carbon atoms such as propane, n-butane, isobutane, n-pentane, isopentane, and neopentane; ethers such as dimethyl ether, diethyl ether, and methyl ethyl ether; halogenated hydrocarbons such as monochloromethane, dichloromethane, and dichlorodifluoroethane; and water. At least one selected from the group comprising these blowing agents can be used. In particular, the use of carbon dioxide is preferred in terms of environmental load and foaming performance. The amount of the blowing agent added is not particularly limited, but is preferably from 2 to 10000 parts by weight, more preferably from 5 to 5000 parts by weight, and even more preferably from 10 to 1000 parts by weight per 100 parts by weight of the resin particles made of the P3HA composition. If the amount of the blowing agent added is less than 2 parts by weight, foam particles having a low apparent density are likely to be difficult to obtain. If the amount of the blowing agent added is more than 10000 parts by weight, such use of the blowing agent is likely to be economically wasteful because the increase in the amount of the blowing agent does not necessarily provide an enhanced effect.

In the depressurization foaming, when the resin particles made of the P3HA composition are impregnated and reacted with the crosslinking agent and optionally the crosslinking aid, the oxygen concentration inside the pressure-resistant vessel and the content of dissolved oxygen in the water are preferably reduced in order to increase the crosslinking efficiency. Examples of the method for this purpose include replacement of the oxygen with an inorganic gas such as carbon dioxide or nitrogen and removal of the oxygen by vacuuming.

In the depressurization foaming, the rate of temperature increases up to the desired foaming temperature (this rate is referred to also as "temperature increase rate" hereinafter) is preferably from 1 to 3° C./min and more preferably from 1.5 to 3° C./min. If the temperature increase rate is lower than 1° C./min, the productivity is likely to be low. If the temperature increase rate is higher than 3° C./min, the impregnation of the resin particles made of the P3HA composition with the blowing agent and the impregnation and reaction of the resin particles with the crosslinking agent are likely to be insufficient during the temperature increase.

In the depressurization foaming, the foaming temperature varies depending on various factors such as the type of the P3HA, the type of the blowing agent, and the desired apparent density of the foam particles and cannot be definitely specified. Preferably, the foaming temperature is lower than the melting point (Tmp) of the resin particles that have yet to be foamed. Specifically, for example, the foaming temperature is preferably from 100 to 140° C. If the foaming temperature is extremely low (e.g., a temperature below 100° C.), foam particles having a low apparent density are likely to be difficult to obtain. If the foaming temperature is extremely high (e.g., a temperature above 140° C.), the resin particles made of the P3HA composition are likely to be hydrolyzed in the pressure-resistant vessel.

In the depressurization foaming, the foaming pressure is preferably from 1 to 10 MPa (gauge pressure) and more preferably from 2 to 5 MPa (gauge pressure). If the foaming pressure is less than 1 MPa (gauge pressure), foam particles having a low apparent density are likely to be difficult to obtain.

In the depressurization foaming, the temperature at which the resin particles made of the P3HA composition are impregnated with the blowing agent and impregnated and reacted with the crosslinking agent varies depending on various factors such as the type of the P3HA and the type of the crosslinking agent and cannot be definitely specified. Preferably, the temperature is from 100 to 140° C. The time of holding at this temperature is preferably from 30 to 120 minutes and more preferably from 45 to 90 minutes.

In the depressurization foaming, the time of holding at around the temperature of foaming is not particularly limited, but is preferably from 30 to 120 minutes and more preferably from 45 to 90 minutes. If this holding time is less than 30 minutes, part of the crosslinking agent is likely to remain unreacted in the resin particles. If the holding time is more than 120 minutes, the resin particles made of the P3HA composition are likely to be hydrolyzed.

In the depressurization foaming, when the contents of the pressure-resistant vessel such as the resin particles made of the P3HA composition and water are discharged into the low-pressure atmosphere, this discharge of the contents may be accomplished through an orifice with a diameter of 1 to 5 mm for purposes such as regulating the flow rate and reducing the variation of the expansion ratio. In the case where the resin particles made of the P3HA composition have a relatively high melting point, the low-pressure atmosphere may be filled with saturated water vapor for the purpose of improving the foaming performance.

In some cases, P3HA foam particles having a desired apparent density cannot be obtained only by the depressurization foaming. In such a case, the pressure inside the P3HA foam particles obtained by the depressurization foaming (this pressure is referred to also as "foam particle inner pressure" hereinafter) may be increased above ordinary pressure by a pressurization process in which the P3HA foam particles are placed into a pressure-resistant vessel and impregnated with an inorganic gas such as air or carbon dioxide and, after the pressurization process, the P3HA foam particles may be heated by means such as heated steam and thus further expanded into P3HA two-step-foam particles having the desired apparent density (this series of procedures is referred to also as "two-step foaming" hereinafter).

The foam particle inner pressure in the two-step foaming is preferably from 0.15 to 0.60 MPa (absolute pressure) and more preferably from 0.20 to 0.50 MPa (absolute pressure).

In the two-step foaming, the temperature inside the pressure-resistant vessel during impregnation of the P3HA foam particles with the inorganic gas is preferably from 10 to 90° C. and more preferably from 40 to 90° C.

In the two-step foaming, the pressure of the means such as heated steam for heating the P3HA foam particles (this pressure is referred to also as "two-step foaming pressure" hereinafter) varies depending on the properties of the foam particles used and the desired apparent density and cannot be definitely specified. The two-step foaming pressure is preferably from 0.01 to 0.17 MPa (gauge pressure) and more preferably from 0.01 to 0.10 MPa (gauge pressure).

The P3HA two-step-foam particles preferably have an apparent density, a closed-cell ratio, and an average cell size as described above for the P3HA foam particles.

[P3HA Foam Molded Article]

The method for producing the P3HA foam molded article is not limited to a particular technique, and the P3HA foam molded article can be produced using a known or common method. Examples of the method include, but are not limited to, the following in-mold foam molding methods (A) to (D).

(A) A method of pressurizing the P3HA foam particles (including the P3HA two-step-foam particles described above; the same applies to the following description) with an inorganic gas to impregnate the foam particles with the inorganic gas and allow the foam particles to have a given foam particle inner pressure; then filling a mold with the foam particles; and heating the foam particles by heated steam.

(B) A method of filling a mold with the P3HA foam particles; then compressing the foam particles so that the volume of the foam particles in the mold is reduced by 10 to 75%; and heating the foam particles by heated steam.

(C) A method of compressing the P3HA foam particles by a gas pressure; filling a mold with the compressed foam particles; and heating the foam particles by heated steam while making use of the recovery capacity of the foam particles.

(D) A method of filling a mold with the P3HA foam particles without any particular pretreatment; and heating the foam particles by heated steam.

In the production of the P3HA foam molded article, the pressure of the heated steam for heating the P3HA foam particles (this pressure is referred to also as "molding pressure" hereinafter) varies depending on various factors such as the properties of the foam particles used and cannot be definitely specified. The molding pressure is preferably from 0.05 to 0.30 MPa (gauge pressure) and more preferably from 0.08 to 0.25 MPa (gauge pressure).

In the method (A) of the above P3HA foam molded article production methods, the inorganic gas used can be, for example, air, nitrogen, oxygen, carbon dioxide, helium, neon, or argon, and at least one selected from the group comprising these gases can be used. Among these gases, air or carbon dioxide is preferred.

In the method (A) of the above P3HA foam molded article production methods, the foam particle inner pressure is preferably from 0.10 to 0.30 MPa (absolute pressure) and more preferably from 0.11 to 0.25 MPa (absolute pressure).

In the method (A) of the above P3HA foam molded article production methods, the temperature inside the pressure-resistant vessel during impregnation of the foam particles with the inorganic gas is preferably from 10 to 90° C. and more preferably from 40 to 90° C.

The P3HA foam molded article can be used in various products such as cushioning materials for packaging, boxes for agricultural products, boxes for fishes, automobile parts, materials for building construction, and materials for civil engineering.

EXAMPLES

Hereinafter, the present invention will be specifically described using examples. It should be noted that the technical scope of the present invention is not limited by the examples given below.

The materials used in Examples and Comparative Examples are listed below.

[Poly(3-hydroxyalkanoate)]

P3HA-1: P3HB3HH (Kaneka Biodegradable Polymer PHBH X131N manufactured by Kaneka Corporation; monomer ratio 3HB/3HH=95/5 (mol %/mol %), melting point=145° C., melt flow rate=2 g/10 min)

P3HA-2: P3HB3HH (Kaneka Biodegradable Polymer PHBH X331N manufactured by Kaneka Corporation; monomer ratio 3HB/3HH=95/5 (mol %/mol %), melting point=145° C., melt flow rate=15 g/10 min)

P3HA-3: P3HB3HH (Kaneka Biodegradable Polymer PHBH X151N manufactured by Kaneka Corporation; monomer ratio 3HB/3HH=89/11 (mol %/mol %), melting point=130° C., melt flow rate=2 g/10 min)

P3HA-4: P3HB4HB (EM 5400 manufactured by Ecomann Biotechnology Co., Ltd.; monomer ratio 3HB/4HB=86/14 (mol %/mol %), melting point=131° C., melt flow rate=1 g/10 min)

[Cell Controlling Agent]

Cell controlling agent: Talc (Talcan Powder PK-S manufactured by Hayashi Kasei Co., Ltd.)

[Coloring Agent]

Coloring agent-1: Black masterbatch (TEP BP-BLACK1 manufactured by Tokyo Printing Ink Mfg Co., Ltd.)

Coloring agent-2: Blue masterbatch (TEP BP-BLUE1 manufactured by Tokyo Printing Ink Mfg Co., Ltd.)

[Dispersant]

Dispersant: Tricalcium phosphate (manufactured by Taihei Chemical Industrial Co., Ltd.)

[Dispersion Aid]

Dispersion aid: Sodium alkylsulfonate (LATEMUL PS manufactured by Kao Corporation)

[Crosslinking Agent]

Crosslinking agent-1: t-Butylperoxy-2-ethylhexyl monocarbonate (content: 97%) (PERBUTYL E manufactured by NOF Corporation)

Crosslinking agent-2: Dibenzoyl peroxide (content: 75%) (NYPER BW manufactured by NOF Corporation)

[Crosslinking Aid]

Crosslinking aid: Methyl methacrylate (manufactured by FUJIFILM Wako Pure Chemical Corporation)

[Plasticizer]

Plasticizer-1: Glycerin diacetomonolaurate (RIKEMAL PL-012 manufactured by Riken Vitamin Co., Ltd.)

Plasticizer-2: Benzyl methyl diethylene glycol adipate (DAIFATTY-101 manufactured by Daihachi Chemical Industry Co., Ltd.)

Plasticizer-3: Tributyl acetylcitrate (manufactured by Asahi Kasei Finechem Co., Ltd.)

The following describes the methods for evaluations carried out in Examples and Comparative Examples.

[Measurement of Melting Point of Resin Particles Made of P3HA Composition]

About 5 mg of the resin particles made of the P3HA composition were weighed out and subjected to differential scanning calorimetry which used a differential scanning calorimeter (DSC 6200 manufactured by Seiko Instruments Inc.) and in which the resin particles were heated from 10° C. to 190° C. at a rate of 10° C./min. The highest melting peak temperature in the DSC curve obtained by the calorimetry was determined as the melting point of the resin particles (an example is shown in the Figure).

[Measurement of MFR of Resin Particles Made of P3HA Composition]

The MFR of the resin particles made of the P3HA composition was measured using a melt flow index tester (manufactured by Yasuda Seiki Seisakusho, Ltd.) according to JIS K 7210 under a load of 5 kg at a measurement temperature which was 1 to 10° C. above the melting end temperature observed in the DSC curve obtained in "Measurement of melting point of resin particles made of P3HA composition".

[Measurement of Gel Fraction of Whole P3HA Foam Particles]

A 100-ml flask was charged with 0.5 g of the P3HA foam particles and 50 ml of chloroform, which were heated under reflux at atmospheric pressure and 62° C. for 8 hours. The resulting heat-treated product was subjected to filtration using a suction filtration device equipped with a 100-mesh metal screen. The resulting filtered product on the mesh screen was dried in an oven at 80° C. under vacuum for 8 hours. The weight Wgw (g) of the resulting dried product was measured. The gel fraction was determined as Wgw/0.5×100 (% by weight).

[Method for Dividing P3HA Foam Particles into Inside and Outside]

The surface portion of each foam particle was cut six times with a razor blade (Hi-stainless Double Edge Blade, manufactured by FEATHER Safety Razor Co., Ltd.) to shape the central portion of the particle into a rectangular parallelepiped. This cutting was done so that the weight of the rectangular parallelepiped into which the central portion was shaped was equal to half of the weight per piece of the foam particles. Such rectangular parallelepipeds were used as the inside of the foam particles, and the surface portions were used as the outside of the foam particles.

[Measurement of Gel Fraction of Inside of P3HA Foam Particles]

A 100-ml flask was charged with 0.5 g of the inside of the P3HA foam particles and 50 ml of chloroform, which were heated under reflux at atmospheric pressure and 62° C. for 8 hours. The resulting heat-treated product was subjected to filtration using a suction filtration device equipped with a 100-mesh metal screen. The resulting filtered product on the mesh screen was dried in an oven at 80° C. under vacuum for 8 hours. The weight Wgi (g) of the resulting dried product was measured. The gel fraction was determined as Wgi/0.5×100 (% by weight).

[Measurement of Gel Fraction of Outside of P3HA Foam Particles]

A 100-ml flask was charged with 0.5 g of the outside of the P3HA foam particles and 50 ml of chloroform, which were heated under reflux at atmospheric pressure and 62° C. for 8 hours. The resulting heat-treated product was subjected to filtration using a suction filtration device equipped with a 100-mesh metal screen. The resulting filtered product on the mesh screen was dried in an oven at 80° C. under vacuum for 8 hours. The weight Wgo (g) of the resulting dried product was measured. The gel fraction was determined as Wgo/0.5×100 (% by weight).

[Measurement of Weight Per Piece of Resin Particles Made of P3HA Composition or P3HA Foam Particles]

There were prepared 100 particles which were the resin particles made of the P3HA composition or the P3HA foam particles, and the weight Wp (mg) of the 100 particles was measured. The weight per piece was determined as Wp/100 (mg).

[Measurement of Length/Diameter Ratio of Resin Particles Made of P3HA Composition or P3HA Foam Particles]

The length and diameter of the resin particles made of the P3HA composition or the P3HA foam particles were measured with a digital caliper (manufactured by Mitutoyo Corporation), and the length/diameter ratio was determined from the measured values. The length is a dimension in the MD direction in which the P3HA composition was discharged from the nozzle of the extruder.

[Measurement of Apparent Density of P3HA Foam Particles or P3HA Two-Step-Foam Particles]

A graduated cylinder containing ethanol was prepared, and the P3HA foam particles or P3HA two-step-foam particles (the weight of the foam particles was Wd (g)) were submerged into the ethanol in the graduated cylinder using a tool such as a metal screen. The volume Vd (L) of the foam particles was determined from the increase in the ethanol level. The apparent density of the foam particles was determined as Wd/Vd (g/L).

[Measurement of Closed-Cell Ratio of P3HA Foam Particles or P3HA Two-Step-Foam Particles]

The volume Vc (cm$^3$) of the P3HA foam particles or P3HA two-step-foam particles was measured using an air comparison pycnometer (Model 1000, manufactured by Tokyo-Science, Co., Ltd.) according to the method specified in PROCEDURE C of ASTM D2856-87. Next, all of the foam particles subjected to the measurement of the volume Vc were submerged into ethanol in a graduated cylinder, and the apparent volume Va (cm$^3$) of the foam particles was determined from the increase in the liquid level of the graduated cylinder (submersion method). The closed-cell ratio of the foam particles was determined as 100−(Va−Vc)×100/Va (%).

[Measurement of Average Cell Size of P3HA Foam Particles or P3HA Two-Step-Foam Particles]

The P3HA foam particles or P3HA two-step-foam particles were cut into halves with a razor blade (Hi-stainless Double Edge Blade, manufactured by FEATHER Safety Razor Co., Ltd.). The cut surface of each foam particle was observed with an optical microscope (VHX-100, manufactured by Keyence Corporation) at 50-fold magnification, and a straight line passing substantially through the center of the foam particle was drawn in the observed image. The number n of the cells through which the straight line passed was counted, and the foam particle size L (μm) defined by the intersections of the straight line with the outer surface of the foam particle was determined. The average cell size of the foam particles was determined as L/n (μm).

[Evaluation of Range of Molding Conditions in P3HA Foam Molded Article Production]

Concerning heated steam used in producing P3HA foam molded articles from P3HA foam particles or P3HA two-step-foam particles, the heated steam pressure range over which the foam molded article production was possible was evaluated according to the following criteria.

Good: The width of the heated steam pressure range over which the molding was possible was 0.05 MPa (gauge pressure) or more.

Average: The width of the heated steam pressure range over which the molding was possible was less than 0.05 MPa (gauge pressure).

Poor: The molding failed, and a desired foam molded article was not obtained.

[Evaluation of Color Unevenness of P3HA Foam Molded Article]

The surface of the P3HA foam molded article was visually inspected, and the P3HA foam molded article was evaluated according to the following criteria.

Good: The P3HA foam molded article was evenly colored, and there was little color unevenness in each of the foam particles observed at the surface of the foam molded article and between the foam particles.

Poor: The P3HA foam molded article was unevenly colored and had pale colored or deep colored spots.

[Measurement of Density of P3HA Foam Molded Article]

The length, width, and thickness of the P3HA foam molded article were measured with a digital caliper (manufactured by Mitutoyo Corporation), and the volume of the foam molded article was determined from the measured values. The weight of the foam molded article was divided by the volume of the foam molded article, and the resulting value was adopted as the density of the foam molded article.

Example 1

[Production of Resin Particles Made of P3HA Composition]

P3HA-1 was used as the P3HA, and 100 parts by weight of P3HA-1 and 0.1 parts by weight of the cell controlling agent were weighed out and dry-blended. The mixture resulting from the dry blending was melted and kneaded using a twin-screw extruder (TEM-26SX manufactured by Toshiba Machine Co., Ltd.) with the cylinder temperature set to 130 to 160° C. The molten P3HA composition having a temperature of 183° C. was discharged from the nozzle of the die mounted on the outlet end of the extruder, and the discharged P3HA composition was cooled with water at 43° C. The cooled composition was cut to obtain resin particles having a weight per piece of 2.0 mg and a length/diameter ratio of 2.5. For the obtained resin particles, the Tmp was 145° C., and the MFR as measured at 160° C. was 2.2 g/10 min.

[Production of P3HA Foam Particles]

100 parts by weight of the obtained resin particles made of the P3HA composition, 200 parts by weight of pure water, 1.0 parts by weight of the dispersant, 0.1 parts by weight of the dispersion aid, and 2 parts by weight of the crosslinking agent were placed into a pressure-resistant vessel under stirring, and this was followed by vacuuming to remove oxygen from the pressure-resistant vessel. Carbon dioxide serving as the blowing agent was then introduced into the pressure-resistant vessel. Subsequently, the contents of the pressure-resistant vessel were heated to a foaming temperature of 129.5° C. Carbon dioxide was then further introduced into the pressure-resistant vessel, and the pressure inside the pressure-resistant vessel was increased to a foaming pressure of 3.3 MPa (gauge pressure). After that, the contents of the pressure-resistant vessel were held at around the foaming temperature and foaming pressure for 60 minutes. A valve located at a lower portion of the pressure-resistant vessel was then opened, and the contents of the pressure-resistant vessel were discharged into an atmospheric pressure through an orifice with a diameter of 3.6 mm. Thus, foam particles were obtained. The foam particles were washed to remove the dispersant attached to the surfaces of the foam particles and then were dried at 75° C. The gel fraction of the resulting whole foam particles was 67% by weight. The gel fraction of the inside of the foam particles was 65% by weight, the gel fraction of the outside of the foam particles was 67% by weight, and the difference in gel fraction between the inside and outside of the foam particles was 2% by weight. The weight per piece was 2.0 mg, and the length/diameter ratio was 1.0. These and other properties of the foam particles are summarized in Table 1.

that the component proportions and foaming conditions were changed as shown in Table 1, and evaluations were carried out in the same manner as in Example 1. The results are summarized in Table 1. In the cases where the coloring agent was added, the coloring agent was dry-blended together with P3HA-1 and the cell controlling agent.

Table 1 reveals that with the use of the whole foam particles in which the gel fraction was from 30 to 80% by weight and the difference in gel fraction between the inside

TABLE 1

| | | | Example 1 | Example 2 | Example 3 | Example 4 | Comp. Example 1 | Comp. Example 2 | Comp. Example 3 |
|---|---|---|---|---|---|---|---|---|---|
| Component proportions | P3HA-1 | parts by weight | 100 | 100 | 100 | 100 | 100 | 100 | 100 |
| | Cell controlling agent | parts by weight | 0.1 | 0.1 | 0.1 | 0.1 | 0.1 | 0.1 | 0.1 |
| | Coloring agent-1 | parts by weight | | | 1 | | | 1 | 1 |
| | Coloring agent-2 | parts by weight | | | | 1 | | | |
| | Crosslinking agent-1 | parts by weight | 2 | 1.5 | 2 | 2 | | 1 | |
| | Crosslinking agent-2 | parts by weight | | | | | | | 2 |
| Foaming conditions | Foaming temperature | ° C. | 129.5 | 129.5 | 129.5 | 129.5 | 129.0 | 129.5 | 128.5 |
| | Foaming pressure (gauge pressure) | MPa | 3.3 | 3.3 | 3.3 | 3.3 | 3.3 | 3.3 | 3.3 |
| Properties of foam particles | Gel fraction (whole foam particle) | % by weight | 67 | 57 | 68 | 68 | 0 | 28 | 67 |
| | Gel fraction (inside) | % by weight | 65 | 56 | 66 | 66 | 0 | 26 | 21 |
| | Gel fraction (outside) | % by weight | 67 | 59 | 68 | 68 | 0 | 30 | 70 |
| | Difference in gel fraction between inside and outside | % by weight | 2 | 3 | 2 | 2 | 0 | 4 | 49 |
| | Length/diameter | — | 1.0 | 1.0 | 1.0 | 1.0 | 1.2 | 1.1 | 1.2 |
| | Apparent density | g/L | 71 | 69 | 73 | 73 | 74 | 66 | 73 |
| | Closed-cell ratio | % | 99 | 98 | 98 | 99 | 98 | 98 | 98 |
| | Average cell size | μm | 183 | 185 | 177 | 179 | 167 | 194 | 201 |
| Foam molded article | Range of molding conditions | — | Good | Good | Good | Good | Poor | Average | Good |
| | Color unevenness | — | Good | Good | Good | Good | — | Good | Poor |
| | Density of foam molded article | g/L | 48 | 46 | 50 | 50 | — | 46 | 50 |

[Production of P3HA Foam Molded Articles]

The foam particles obtained as above were placed into a pressure-resistant vessel heated to 80° C. and were pressurized with air to attain a foam particle inner pressure of 0.18 MPa (absolute pressure). The foam particles were charged into a 370 mm-long, 320 mm-wide, 60 mm-thick mold of a molding machine (EP-900 manufactured by DAISEN Co., Ltd.). The foam particles were then heated by heated steam with different pressures varying from 0.08 to 0.26 MPa (gauge pressure) in increments of 0.02 MPa (gauge pressure), and thus a corresponding number of foam molded articles were obtained. The foam molded articles were dried at 75° C. The evaluation results of the foam molded articles are summarized in Table 1. The range of molding conditions in the foam molded article production was wide, and there was little color unevenness in the foam molded articles obtained.

Examples 2 to 4 and Comparative Examples 1 to 3

Resin particles, foam particles, and foam molded articles were produced in the same manner as in Example 1, except and outside was 25% by weight or less (Examples 1 to 4), the range of molding conditions in the foam molded article production was wide, and there was little color unevenness in the foam molded articles obtained.

In contrast, with the use of the whole foam particles in which the gel fraction was less than 30% by weight (Comparative Examples 1 and 2), the foam molded article production was impossible, or the range of molding conditions in the foam molded article production was narrow. With the use of the whole foam particles in which the gel fraction was in the range of 30 to 80% by weight but the difference in gel fraction between the inside and outside was more than 25% by weight (Comparative Example 3), there was color unevenness in the foam molded articles obtained, although the range of molding conditions in the foam molded article production was wide.

Examples 5 to 8

Resin particles, foam particles, and foam molded articles were produced in the same manner as in Example 1, except that the component proportions and foaming conditions were changed as shown in Table 2, and evaluations were carried out in the same manner as in Example 1. The results are summarized in Table 2. In the cases where the coloring agent was added, the coloring agent was dry-blended together with P3HA-1 and the cell controlling agent. In the case where the crosslinking aid was added, the crosslinking aid was placed into the pressure-resistant vessel together with the resin particles, pure water, dispersant, dispersion aid, and crosslinking agent. In all of Examples, the gel fraction of the whole foam particles was in the range of 30 to 80% by weight, and the difference in gel fraction between the inside and outside of the foam particles was 25% by weight or less. The range of molding conditions in the foam molded article production was wide, and there was little color unevenness in the foam molded articles obtained.

(TEM-26SX manufactured by Toshiba Machine Co., Ltd.) with the cylinder temperature set to 130 to 160° C. The molten P3HA composition having a temperature of 180° C. was discharged from the nozzle of the die mounted on the outlet end of the extruder, and the discharged P3HA composition was cooled with water at 43° C. The cooled composition was cut to obtain resin particles having a weight per piece of 2.0 mg and a length/diameter ratio of 2.5. In the above process, a liquid feed pump (manufactured by Nikkiso Co., Ltd.) was connected to the extruder, and 5 parts by weight of the plasticizer was added through the pump. The component proportions are summarized in Table 2.

Foam particles and foam molded articles were produced in the same manner as in Example 1, except that the resin particles obtained as above were used. Evaluations were carried out in the same manner as in Example 1, and the results are summarized in Table 2. In all of Examples, the gel fraction of the whole foam particles was in the range of 30 to 80% by weight, and the difference in gel fraction between the inside and outside of the foam particles was 25% by weight or less. The range of molding conditions in the foam molded article production was wide, and there was little color unevenness in the foam molded articles obtained.

TABLE 2

| | | | Example 5 | Example 6 | Example 7 | Example 8 | Example 9 | Example 10 | Example 11 |
|---|---|---|---|---|---|---|---|---|---|
| Component proportions | P3HA-1 | parts by weight | | | | 100 | 100 | 100 | 100 |
| | P3HA-2 | parts by weight | 100 | | | | | | |
| | P3HA-3 | parts by weight | | 100 | | | | | |
| | P3HA-4 | parts by weight | | | 100 | | | | |
| | Cell controlling agent | parts by weight | 0.1 | 0.1 | 0.1 | 0.1 | 0.1 | 0.1 | 0.1 |
| | Coloring agent-1 | parts by weight | 1 | 1 | 1 | 1 | 1 | 1 | 1 |
| | Crosslinking agent-1 | parts by weight | 2.5 | 2 | 2 | 2 | 2 | 2 | 2 |
| | Crosslinking aid | parts by weight | | | | 0.01 | | | |
| | Plasticizer-1 | parts by weight | | | | | 5 | | |
| | Plasticizer-2 | parts by weight | | | | | | 5 | |
| | Plasticizer-3 | parts by weight | | | | | | | 5 |
| Foaming conditions | Foaming temperature | ° C. | 129.5 | 114.5 | 115.5 | 129.5 | 126.5 | 126.5 | 126.5 |
| | Foaming pressure (gauge pressure) | MPa | 3.3 | 3.3 | 3.3 | 3.3 | 4.0 | 4.0 | 4.0 |
| Properties of foam particles | Gel fraction (whole foam particle) | % by weight | 63 | 62 | 63 | 78 | 75 | 74 | 72 |
| | Gel fraction (inside) | % by weight | 62 | 61 | 62 | 76 | 73 | 73 | 69 |
| | Gel fraction (outside) | % by weight | 64 | 64 | 64 | 79 | 76 | 75 | 72 |
| | Difference in gel fraction between inside and outside | % by weight | 2 | 3 | 2 | 3 | 3 | 2 | 3 |
| | Length/diameter | — | 1.2 | 0.9 | 0.9 | 1.0 | 1.0 | 1.0 | 1.0 |
| | Apparent density | g/L | 69 | 73 | 74 | 75 | 48 | 48 | 47 |
| | Closed-cell ratio | % | 98 | 98 | 98 | 99 | 98 | 98 | 98 |
| | Average cell size | μm | 189 | 179 | 173 | 170 | 227 | 230 | 241 |
| Foam molded article | Range of molding conditions | — | Good | Good | Good | Good | Good | Good | Good |
| | Color unevenness | — | Good | Good | Good | Good | Good | Good | Good |
| | Density of foam molded article | g/L | 47 | 50 | 50 | 51 | 33 | 33 | 32 |

Examples 9 to 11

[Production of Resin Particles Made of P3HA Composition]

P3HA-1 was used as the P3HA, and 100 parts by weight of P3HA-1, 0.1 parts by weight of the cell controlling agent, and 1 parts by weight of coloring agent-1 were weighed out and dry-blended. The mixture resulting from the dry blending was melted and kneaded using a twin-screw extruder Example 12

[Production of P3HA Foam Molded Articles]

The foam particles obtained in Example 3 were charged into a 370 mm-long, 320 mm-wide, 84 mm-thick mold of a molding machine (EP-900 manufactured by DAISEN Co., Ltd.) without being pressurized with air, and were compressed by 24 mm in the thickness direction. The foam particles were then heated by heated steam with different pressures varying from 0.08 to 0.26 MPa (gauge pressure) in increments of 0.02 MPa (gauge pressure), and thus a corresponding number of foam molded articles were obtained. The foam molded articles were dried at 75° C. The evaluation results of the foam molded articles are summarized in Table 3. The range of molding conditions in the foam molded article production was wide, and there was little color unevenness in the foam molded articles obtained.

TABLE 3

| | | | Example 12 | Example 13 |
|---|---|---|---|---|
| Foam molded article | Range of molding conditions | — | Good | Good |
| | Color unevenness | — | Good | Good |
| | Density of foam molded article | g/L | 75 | 25 |

Example 13

[Production of P3HA Two-Step-Foam Particles and Foam Molded Articles]

The foam particles obtained in Example 3 were placed into a pressure-resistant vessel heated to 80° C. and were pressurized with air to attain a foam particle inner pressure of 0.30 MPa (absolute pressure). Subsequently, the foam particles were heated by heated steam with a steam pressure of 0.04 MPa (gauge pressure) to obtain two-step-foam particles, which were then dried at 75° C. The apparent density of the two-step-foam particles was 37 g/L.

Foam molded articles were produced using the two-step-foam particles in the same manner as in Example 1. Evaluations were carried out in the same manner as in Example 1, and the results are summarized in Table 3. The range of molding conditions in the foam molded article production was wide, and there was little color unevenness in the foam molded articles obtained.

Reference Example

Depressurization foaming was conducted at a foaming temperature of 129.5° C. and a foaming pressure of 0.5 MPa (gauge pressure) in the same manner as in Example 1, except that carbon dioxide serving as the blowing agent was not used. For the resin particles subjected to the depressurization foaming, the gel fraction of the whole foam particles was 65% by weight. However, the resin particles were not foamed and had an apparent density of 1202 g/L.

As described above, it has been demonstrated that with the use of the P3HA foam particles of the present invention, the range of molding conditions in foam molded article production is wide, and there is little color unevenness in the foam molded articles obtained.

The invention claimed is:

1. A poly(3-hydroxyalkanoate) foam particle, wherein a gel fraction of a whole foam particle is from 30 to 80% by weight, and a difference between a gel fraction inside of the foam particle and a gel fraction outside of the foam particle is 25% by weight or less.

2. The poly(3-hydroxyalkanoate) foam particle according to claim 1, wherein a weight per piece of the foam particle is from 0.3 to 10 mg, and a length/diameter ratio of the foam particle is from 0.5 to 2.5.

3. The poly(3-hydroxyalkanoate) foam particle according to claim 1, wherein the poly(3-hydroxyalkanoate) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

4. The poly(3-hydroxyalkanoate) foam particle according to claim 1, wherein the poly(3-hydroxyalkanoate) is a copolymer of 3-hydroxybutyrate and a comonomer, and a 3-hydroxybutyrate/comonomer ratio in the copolymer is from 99/1 to 80/20 (mol %/mol %).

5. The poly(3-hydroxyalkanoate) foam particle according to claim 1, wherein the poly(3-hydroxyalkanoate) is cross-linked by an organic peroxide.

6. The poly(3-hydroxyalkanoate) foam particle according to claim 5, wherein the organic peroxide has a 1 hour half-life temperature of 114 to 124° C., contains a carbonate group, and is liquid at room temperature.

7. The poly(3-hydroxyalkanoate) foam particle according to claim 1, wherein an apparent density of the foam particle is from 20 to 150 g/L.

8. A poly(3-hydroxyalkanoate) foam molded article produced by molding a plurality of the foam particles according to claim 1.

9. A method for producing the foam particle according to claim 1, the method comprising:
    dispersing poly(3-hydroxyalkanoate)-containing resin particles and a crosslinking agent into water in a pressure-resistant vessel;
    subsequently introducing a blowing agent into the pressure-resistant vessel and heating the contents of the pressure-resistant vessel to or above a softening temperature of the resin particles; and
    subsequently opening one end of the pressure-resistant vessel to discharge the contents of the pressure-resistant vessel into a low-pressure atmosphere and thus foam the resin particles, wherein
    the crosslinking agent is an organic peroxide that has a 1 hour half-life temperature of 114 to 124° C., that contains a carbonate group, and that is liquid at room temperature, and
    the crosslinking agent is used in an amount of 1.2 to 5 parts by weight per 100 parts by weight of the resin particles.

10. The method according to claim 9, wherein the organic peroxide is a compound containing one carbonate group.

11. The method according to claim 9, wherein in the heating of the contents of the pressure-resistant vessel to or above a softening temperature of the resin particles, the contents of the pressure-resistant vessel are subjected to a temperature of 100 to 140° C.

12. The poly(3-hydroxyalkanoate) foam particle according to claim 1, wherein the gel fraction of the whole foam particle is from 50 to 78% by weight.

13. The poly(3-hydroxyalkanoate) foam particle according to claim 1, wherein the difference between the gel fraction inside of the foam particle and the gel fraction outside of the foam particle is 10% by weight or less.

14. The poly(3-hydroxyalkanoate) foam particle according to claim 1, wherein the difference between the gel fraction inside of the foam particle and the gel fraction outside of the foam particle is 5% by weight or less.

15. The poly(3-hydroxyalkanoate) foam particle according to claim 1, wherein the foam particle has a cylindrical shape.

16. The method according to claim 9, wherein the cross-linking agent is used in an amount of 1.5 to 3 parts by weight per 100 parts by weight of the resin particles.

* * * * *